United States Patent [19]

Lowe

[11] Patent Number: 4,975,135

[45] Date of Patent: Dec. 4, 1990

[54] METHOD OF FORMING A VEHICLE SEAT WITH A STYLIZED SEATING SURFACE

[75] Inventor: Michael E. Lowe, Saline, Mich.

[73] Assignee: Hoover Universal, Inc., Ann Arbor, Mich.

[21] Appl. No.: 345,789

[22] Filed: May 1, 1989

[51] Int. Cl.⁵ .............................................. B32B 31/20
[52] U.S. Cl. .................................... 156/155; 156/214;
  156/221; 156/222; 156/245; 156/285; 156/256;
  297/DIG. 1; 297/DIG. 2
[58] Field of Search ................... 156/221, 155, 309.6,
  156/182, 214, 245, 285, 222, 256; 297/DIG. 1,
  DIG. 2; 29/91.1; 5/451; 425/388

[56] References Cited

U.S. PATENT DOCUMENTS

| | | | |
|---|---|---|---|
| 3,161,436 | 12/1964 | Hood | 297/DIG. 2 X |
| 3,654,019 | 4/1972 | Cusick | 156/382 X |
| 3,675,970 | 7/1972 | Bereday | 297/DIG. 2 X |
| 4,379,687 | 4/1983 | Wilson et al. | 425/388 |
| 4,534,595 | 8/1985 | Abe et al. | 297/DIG. 1 X |
| 4,637,789 | 1/1987 | Netznik | 425/388 X |
| 4,692,199 | 9/1987 | Kozlowski et al. | 156/285 X |
| 4,699,427 | 10/1987 | Kobayashi | 297/DIG. 1 X |
| 4,795,215 | 1/1989 | Shimada | 297/DIG. 1 X |
| 4,795,517 | 1/1989 | Elliott et al. | 156/221 |
| 4,840,430 | 6/1989 | Shimada | 297/DIG. 1 X |

Primary Examiner—Michael W. Ball
Assistant Examiner—Michele K. Yoder
Attorney, Agent, or Firm—Harness, Dickey & Pierce

[57] ABSTRACT

A method of manufacturing a vehicle seat cover and bonding the vehicle seat cover to a foam bun utilizing a style insert. The style insert is formed by taking a breathable cloth fabric and laminating it to a sheet of foam material. The composite so formed is then cut to a desired styled insert shape and sewn to the vehicle seat cover skirt to form a seat cover assembly.

The composite, which may include an air impermeable barrier sheet or the barrier sheet may be included in the composite between the foam and fabric sheets, is positioned on a forming tool having removable style inserts, with the cloth side of the composite against the insert. An impermeable film is then positioned over the foam side of the insert composite and a vacuum drawn the forming tool and the impermeable film to draw the composite down into conformity with the style lines of the tool insert. An adhesively coated foam bun is then positioned and pressed against the composite on the forming tool. Heat is applied to the forming tool to evaporate the film, allowing the adhesive to bond the cover assembly to the foam bun and release the composite from the forming tool allowing removal of the seat assembly from the forming tool. The edges of the skirt are then fastened together or to the underside of the foam bun so as to at least partially enclose the bun.

4 Claims, 4 Drawing Sheets

METHOD OF FORMING A VEHICLE SEAT WITH A STYLIZED SEATING SURFACE

BACKGROUND AND SUMMARY OF THE INVENTION

This invention relates generally to the field of vehicle seat assemblies and more particularly to a method of forming a vehicle seat having a stylized, contoured surface.

Typically, in the production of a vehicle seat trim cover, a forming tool is constructed and used which has a surface contour complementary to the final desired shape of the vehicle seat or back. One example of such a tool is disclosed in U.S. Pat. No. 4,740,260, issued Apr. 26, 1988, entitled "Method And Apparatus For Manufacturing Seats And Articles Formed Thereby", assigned to the assignee of the present invention. Another method of forming contours in vehicle seat members is disclosed in U.S. Pat. No. 4,860,415, issued Aug. 29, 1989, entitled "Vehicle Seat Assembly With Pour In Place Foam Body", and assigned to the assignee of this application.

In both patents, the vehicle seat cover member is placed inside out on a forming tool having the desired complementary contours to the finished product. Pressure is applied against the cover member to shape the cover member to the contours of the forming tool. The forming tools described in the patents must be individually made with the desired surface contours. Conventionally, a new tool or mold half is required if a new design contour is called for. Accordingly, the tools are relatively expensive to produce.

Forming tools and mold halves having removable inserts which permit simple modification of the insert instead of replacement of the entire tool are described in copending application Ser. No. 310,351, filed 2-14-89, also assigned to the assignee of this application. These forming tools having removable inserts allow quick interchange of styles for producing vehicle seat covers having differing contours as consumer demand dictates and may be used with the present invention.

During assembly of the vehicle seat, the style insert material is placed onto the forming tool and drawn down into conformity with the contours of the forming tool insert by either vacuum forming or the application of a complementarily shaped forming tool. A foam bun is then applied to the seat cover and adhered thereto with a suitable adhesive.

The foam bun, however, must have the predetermined shape corresponding to the inserts used to form the contours in the seat cover in order to properly form the desired contours. Thus, different foam buns are required for each different styling contour desired in a finished vehicle seat surface.

The present invention eliminates the requirement for foam buns having a predetermined finished shape and simplifies the selection of style inserts to more economically form the finished vehicle seat or vehicle seat back assembly. The method according to the present invention forms a composite insert by first laminating a porous cloth fabric or similar economical trim material to a polymeric foam sheet to form a flexible composite. This composite is then cut into the appropriate shape of the finished insert. The vehicle seat or back skirt fabric is then sewn to the edges of the cloth fabric of the insert. The composite portion is then positioned onto a forming tool with the cloth surface of the composite against the forming tool style insert.

An impermeable barrier sheet, such as a polyolefin film is placed over the foam surface of the composite and the composite is then pressed into conformity with the style insert by vacuum drawing the composite into conformity with the style lines. A generic foam bun having a flat surface is sprayed with a suitable adhesive, such as polyurethane glue and pressed against the drawn composite. Heat in the form of steam or the like is then forced through the composite to at least partially evaporate the barrier sheet and thus provide for bonding of the foam of the composite to the foam bun. In the alternative, the barrier sheet can be incorporated in the composite at a position between the fabric and foam sheets.

Thus, as just described, a generic foam bun may be utilized to form a vehicle seat or back cushion having stylized contours without the necessity for specially shaped molds.

During the vacuum drawing of the composite, the barrier sheet of polyolefin film placed over the composite forms a barrier layer which makes the composite impermeable and allows atmospheric pressure to press against and compress the foam and fabric into conformity with the forming tool surface. The completed assembly is then removed and the skirt of the vehicle seat or back is secured to the underside of the assembly to complete the cushion construction.

Thus, the method for forming a portion of a vehicle seat assembly according to the present invention includes the steps of:

a. laminating a sheet of breathable cloth fabric trim material to a sheet of flexible thermoplastic foam to form a composite;

b. placing the composite on a forming tool having an upper surface shaped to the predetermined surface contour;

c. combining a barrier sheet with the composite on the forming tool;

d. applying a vacuum between the tool and the composite to draw the composite against the upper surface of the insert;

e. applying an adhesive to one surface of a foam bun;

f. pressing the surface of the bun against the composite on the forming tool; and g. heating the composite and the barrier sheet to at least partially evaporate the barrier sheet, thus forming the portion of the vehicle seat having the desired styled surface contour.

Once the foam bun is bonded to the composite by the application of heat and pressure, the cover with foam bun attached is removed from the forming tool and the skirt of the seat or back cover is wrapped over the body of the foam bun to at least partially enclose the bun.

Further objects, features and advantages of the present invention will become evident from a consideration of the detailed description when taken in conjunction with the accompanying drawing and the appended claims.

DETAILED DESCRIPTION OF THE INVENTION

Figure 1:
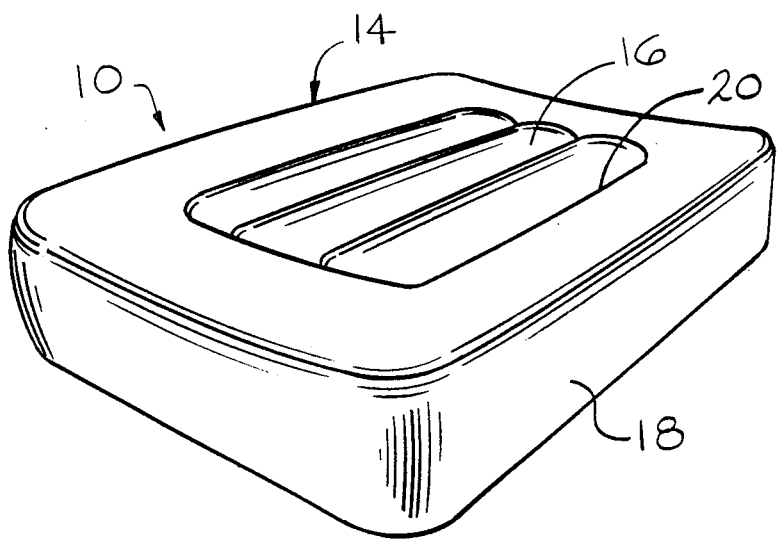
FIG. 1 is a perspective view of a vehicle seat cushion formed in accordance with the present invention.
Figure 2:
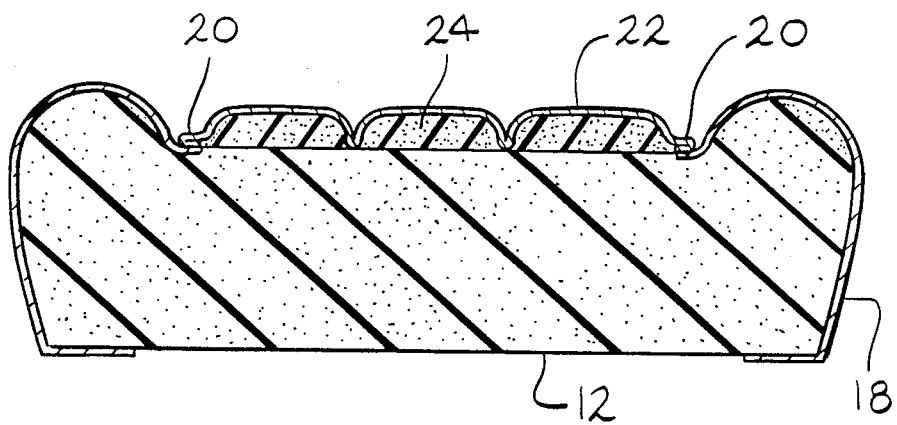
FIG. 2 is a transverse sectional view of the vehicle seat cushion shown in FIG. 1.

Turning now to the drawing, the vehicle seat assembly 10 is shown in FIG. 1. The seat assembly 10 is basically a foam bun 12 covered by a seat cover assembly 14 in accordance with the present invention. Seat cover assembly 14 comprises a style insert composite 16 sewn to a skirt portion 18 along a seam 20. The style insert composite 16 is formed or shaped to a predetermined style configuration such as is shown in FIG. 1 by the method according to the present invention which is described below.

The style insert composite 16 comprises a body or sheet 22 of trim material which can be made of an inexpensive porous cloth that is non-stretch and is laminated to a foam sheet 24 to form a composite sheet material for producing multiple insert composites 16. Each insert composite 16 is then cut or stamped out of the laminated sheet material and then sewn to a skirt portion 18 of seat cover material to form the initial seat cover assembly 14 as shown in FIG. 3 having a skirt portion 18 surrounding insert composite 16.

An impermeable thermoplastic barrier sheet 26 such as a polyolefin film can either be positioned against the foam side of the style insert composite 16 which is in turn placed onto forming tool 28 with the fabric side against a style tool insert 30 which fits into a recess 32 in forming tool 28. The composite 16 including the barrier sheet 26, is then positioned over insert 30 on forming tool 28. Likewise, the sandwich formed by barrier sheet 26 and insert composite 16 may also have a portion first sewn to skirt 18 and then placed onto forming tool 28. In this embodiment the barrier sheet 26 might also be sewn to the skirt 18 so long as the size of the barrier sheet 26 is such that it extends over the edges of the recess 32 in the forming tool 28 to form a seal therearound and the sewn portion is exterior to the edges of said recess 32.

Figure 3:
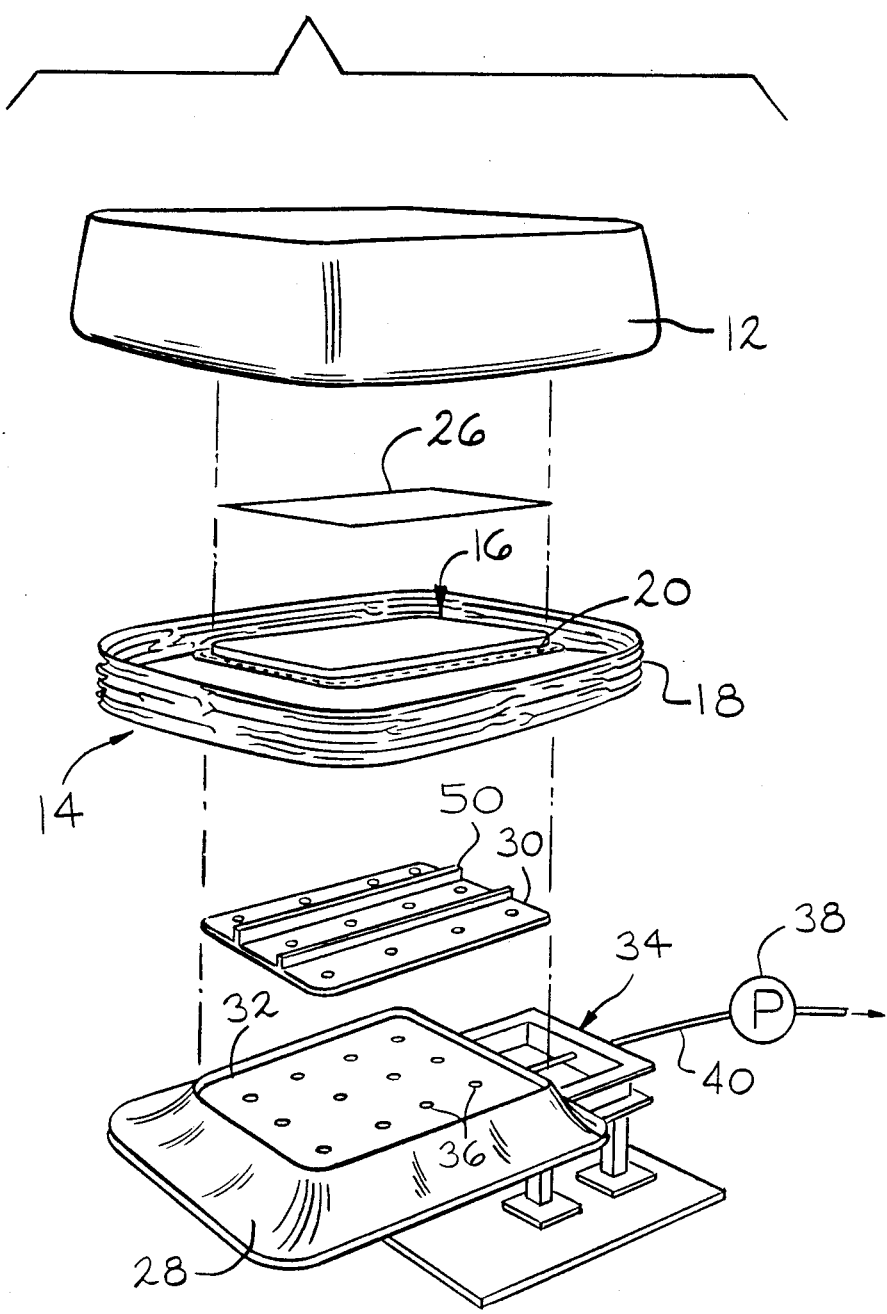
FIG. 3 is an exploded perspective view of the component parts of the vehicle seat shown in FIG. 1 and the forming fixture utilized in the method according to the present invention.
Figure 4:
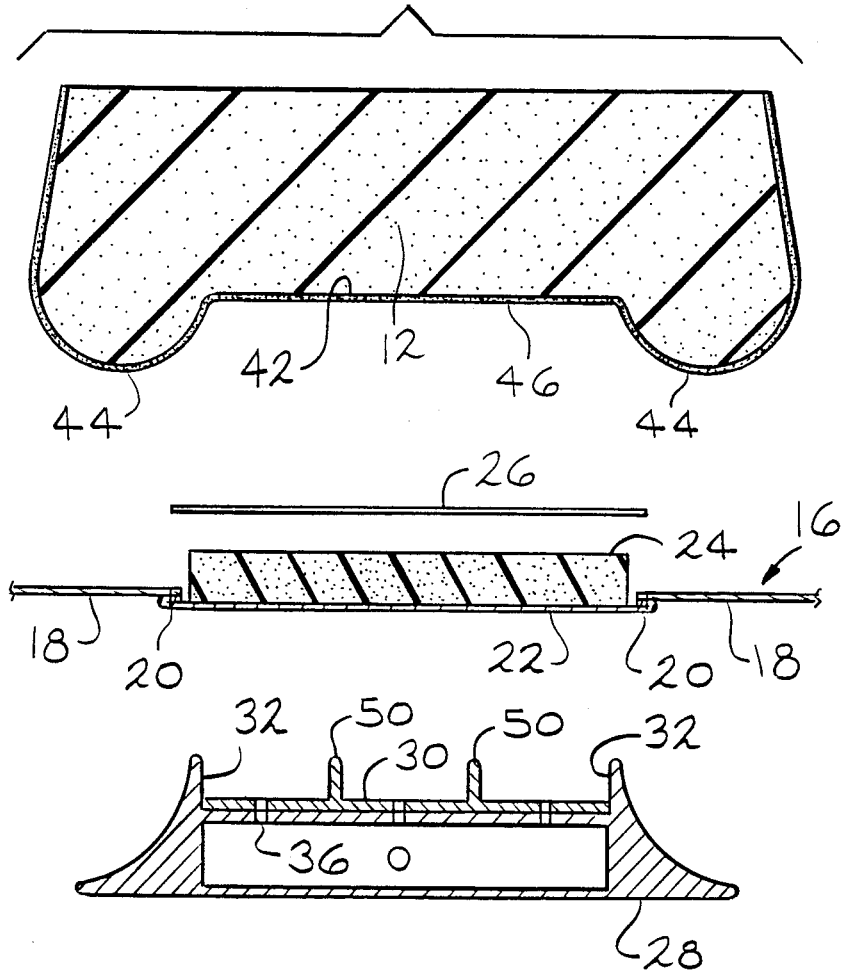
FIG. 4 is an exploded sectional view of the assembly shown in FIG. 3.

As shown in FIG. 3, forming tool 28 is cantilever supported from support frame 34. A plurality of vacuum ports 36 communicate with recess 32 and are connected to a vacuum pump 38 via conduit 40. The vacuum ports 36 are used to vacuum draw composite 16 down into conformity with the surface of perforated insert 30 as described below.

Figure 5:
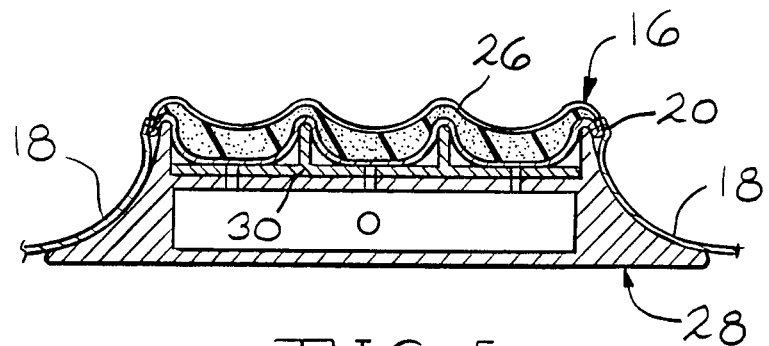
FIG. 5 is a sectional view of the forming tool shown in FIG. 4 with the style insert composite vacuum drawn into conforming position on the tool.

A vacuum is drawn then between the impermeable barrier sheet 26 and the forming tool 28 through vacuum ports 36 so as to draw the style insert composite 16 down into conformity with the upper surface of style tool insert 30, as shown in FIG. 5.

Figure 6:
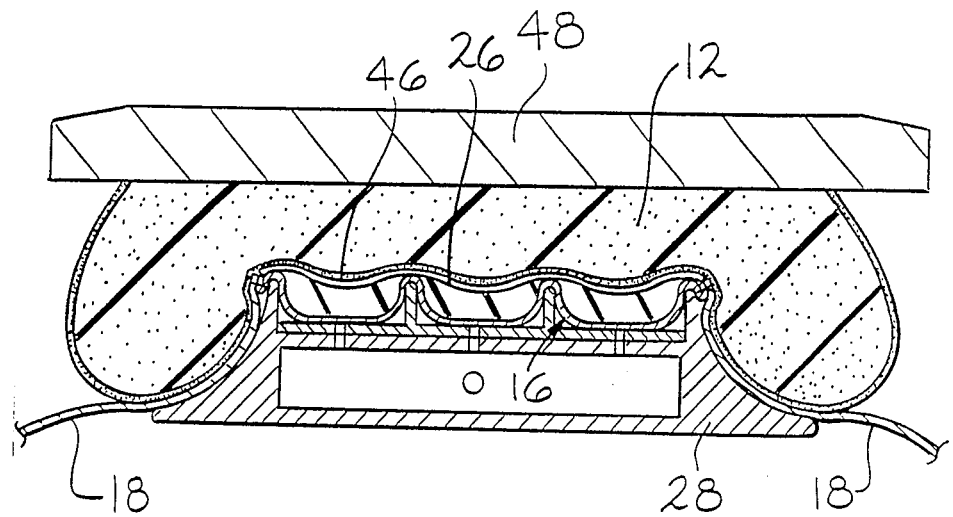
FIG. 6 illustrates the foam bun being pressed against the style insert composite in the forming tool in accordance with the present invention.

Foam bun 12 has a generally flat portion 42 which is sized to receive the style insert composite 16. Foam bun 12 also has bolster portions 44 which basically surround the flat portion 42 and form the edges of the completed vehicle seat. Flat portion 42 and bolster portions 44 are sprayed with an adhesive 46 such as a polyurethane adhesive. Foam bun 12 is then secured to a movable tool 48 and lowered against the style insert composite 16 on forming tool 28 as shown in FIG. 6. Pressure is then applied between the tools to press the flat surface portion 42 of the bun 12 against the impermeable barrier sheet 26. Heat, preferably in the form of steam, is then applied through ports 36 and the composite 16 to the impermeable barrier sheet 26 to at least partially evaporate the barrier sheet 26 allowing the adhesive 46 to bond the foam bun 12 to the foam sheet 24 of the style insert composite 16 and thereby secure the cover assembly 14 to the foam bun 12. The result is a styled seat with excellent style line definition and in which the composite 16 is securely attached to the bun 12.

Figure 7:
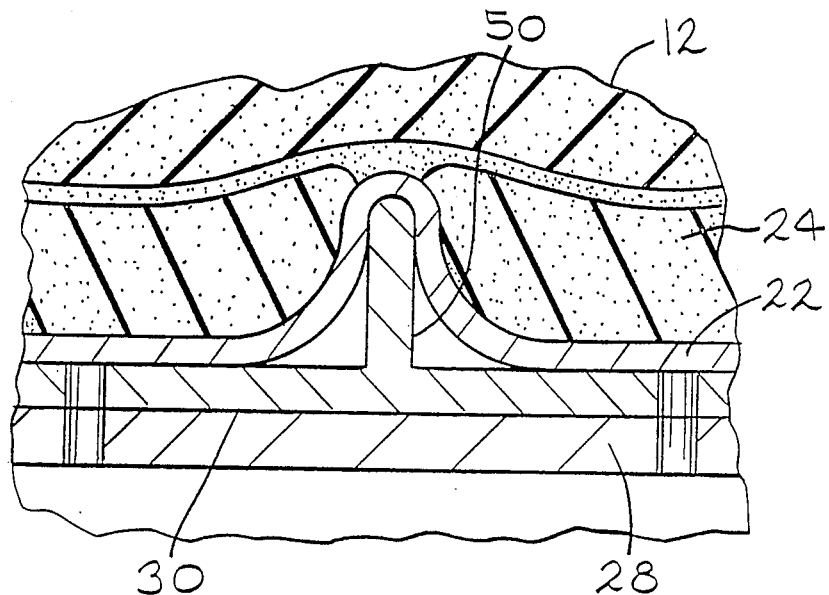
FIG. 7 is an enlarged sectional view of a portion of the structure shown in FIG. 6.

As shown in FIG. 7, ridges 50 on the forming tool insert 30 compress the foam sheet 24 of the insert composite 16 such that adhesive 46 can penetrate through the compressed foam 24 to also bond the trim material sheet 22 to the foam bun 12 along the ridges 50 thus forming the stylized surface shape of the vehicle seat insert 16 shown in FIG. 1. The composite 16 is thus securely attached to the bun 12 at the style lines. The seat cover skirt portion 18 is then at least partially wrapped around and secured to the underside of foam bun 12 to complete the assembly.

The forming tool 28 may be made of a standardized design to receive different style tool inserts 30. Inserts 30 may be designed to have straight parallel ridges 50 as shown in FIG. 3 or any other decorative design. The style insert composites 16 may be formed of a variety of breathable fabric trim materials laminated to the foam sheet 24 and then stamped out into the proper block shape prior to forming the style lines. The insert composites 16 so formed may be chosen to match the desired interior decor of the vehicle for which the vehicle seat is designed.

Thus the method in accordance with the present invention may be summarized as laminating a sheet of low cost trim material 22 to a sheet of flexible foam 24 to form the insert composite 16 having a cloth side and a foam side, positioning the cloth side of the insert composite 16 on a forming tool 28, placing the impermeable barrier sheet 26 over and against the foam side of the insert composite 16 on the forming tool 28, drawing a vacuum between the forming tool 28 and the barrier sheet 26 to draw the insert composite 16 substantially against the upper surface of the style tool insert 30, pressing an adhesively coated foam bun 12 against the impermeable barrier sheet 26 on the insert composite 16 positioned on forming tool 28, and subsequently evaporating at least partially the barrier sheet 26 allowing the adhesive to bond the composite 16 and the seat cover assembly 14 to foam bun 12.

The method according to the present invention increases the versatility of seat forming tools, allows the use of inexpensive trim materials and allows more variation in the styling options available in both vehicle seats and backs. The seat back may also be formed in a similar manner as disclosed above for the vehicle seat. The edges of the skirt portion could be sewn together or sewn to halves of a zipper so that when the completed foam bun with seat cover assembly adhesively bonded thereto is removed from the forming tool, the skirt portions may be wrapped around the sides of the foam bun and zipped closed along the back to complete the seat back assembly.

Modifications to the above described method can of course be made without departing from the scope of this invention. The above description represents only one preferred embodiment of this invention and is not intended to limit the scope of the appended claims.

What is claimed is:

1. In a method of forming a portion of a vehicle seat having a surface of predetermined shape, the steps of:
   a. providing a sheet of air impermeable material which will substantially evaporate when heated;
   b. laminating a sheet of plastic foam to one side of a sheet of permeable trim material to form a composite having a trim side and a foam side;
   c. positioning said impermeable material on said foam side of said composite to form a sandwich having an air impermeable surface;
   d. placing said sandwich on a forming tool having an upper surface complementary to said predetermined shape, with the trim side of said composite against said upper surface of said tool;
   e. establishing a vacuum between said air impermeable surface of said sandwich and said forming tool drawing said sandwich against said upper surface to shape said composite into said predetermined shape;
   f. applying adhesive to a foam bun having a face;
   g. pressing said bun face against said impermeable material on said forming tool; and
   h. heating said sandwich to substantially evaporate said air impermeable material to enable contact of said foam side of said composite with said adhesive to bond said composite to said bun face.

2. The method according to claim 1 wherein said air impermeable material is a polyolefin material.

3. The method according to claim 1 further comprising the steps of:
   a. cutting said composite to a predetermined size; and
   b. sewing a portion of said composite to a skirt portion.

4. In a method of forming a portion of a vehicle seat having a surface of predetermined shape, the steps of:
   a. providing a sheet of air impermeable material which will deteriorate when heated;
   b. laminating a sheet of plastic foam to one side of a sheet of permeable cloth fabric to form a composite having a cloth side and a foam side;
   c. cutting said composite to a predetermined size;
   d. sewing said composite to a vehicle trim cover member having an aperture therein of said predetermined size so as to close said aperture;
   e. positioning said sheet of air impermeable material on said foam side of said composite to form an air impermeable trim material;
   f. placing said trim material on a forming fixture having an insert therein, said insert having an upper surface complementary to said predetermined shape, with the cloth side of said composite against said upper surface of said insert;
   g. establishing a vacuum between said trim material and said fixture drawing said material against said surface to shape said material into said predetermined shape;
   h. placing a foam bun having a face adjacent said material;
   i. applying adhesive to said bun face;
   j. pressing said bun face against said material on said fixture;
   k. heating said material to deteriorate said air impermeable film to enable contact of said foam side of said composite with said adhesive to bond said composite to said bun face and release said bun and said trim material from said fixture;
   l. removing said bun and trim material attached thereto from said fixture; and
   m. securing said said trim cover member to said bun so as to cover said face and at least partially enclose said bun.

* * * * *

UNITED STATES PATENT AND TRADEMARK OFFICE
CERTIFICATE OF CORRECTION

PATENT NO. : 4,975,135

DATED : December 4, 1990

INVENTOR(S) : Michael E. Lowe

It is certified that error appears in the above-identified patent and that said Letters Patent is hereby corrected as shown below:

On the title page, in the Abstract, line 14, after the word "drawn", insert --between--.

Column 6, delete lines 1-38 comprising an erroneous form of Claim 4 and insert in place thereof, the following:

-- 4. In a method of forming a portion of a vehicle seat having a surface of predetermined shape, the steps of:

a. providing a sheet of air impermeable material which will at least partially evaporate when heated;

b. laminating a sheet of plastic foam to one side of a sheet of permeable cloth fabric to form a composite having a cloth side and a foam side;

c. cutting said composite to a predetermined size;

d. sewing said composite to a vehicle trim cover member having an aperture therein of said predetermined size so as to close said aperture;

e. positioning said sheet of air impermeable material on said foam side of said composite to form a seat covering with an air impermeable surface;

f. placing said seat covering on a forming fixture having an insert therein, said insert having an upper surface complementary to said predetermined shape, with the cloth side of said composite against said upper surface of said insert;

UNITED STATES PATENT AND TRADEMARK OFFICE
CERTIFICATE OF CORRECTION

PATENT NO. : 4,975,135
DATED : December 4, 1990
INVENTOR(S) : Michael E. Lowe It is certified that error appears in the above-identified patent and that said Letters Patent is hereby corrected as shown below:

g. establishing a vacuum between said impermeable surface of said seat covering and said fixture drawing said composite against said upper surface to shape said composite into said predetermined shape;

h. providing a foam bun having a face corresponding to said predetermined size;

i. applying adhesive to said bun face;

j. pressing said bun face against said impermeable surface of said seat covering on said fixture;

k. heating said seat covering to evaporate said impermeable surface and enable contact of said foam side of said composite with said adhesive to bond said composite to said bun face;

l. removing said bun with said composite attached thereto from said fixture; and m. securing said seat covering to said bun so as to cover said face and at least partially enclose said bun. --

Signed and Sealed this

Fourth Day of August, 1992

*Attest:*

DOUGLAS B. COMER

*Attesting Officer*      *Acting Commissioner of Patents and Trademarks*